United States Patent
Kim et al.

(10) Patent No.: US 9,348,764 B2
(45) Date of Patent: May 24, 2016

(54) SYSTEM ON CHIP INCLUDING MEMORY MANAGEMENT UNIT AND MEMORY ADDRESS TRANSLATION METHOD THEREOF

(71) Applicants: Seok Min Kim, Suwon-si (KR); Kwan Ho Kim, Suwon-si (KR); Seong Woon Kim, Suwon-si (KR); Tae Sun Kim, Seongnam-si (KR); Kyoung Mook Kim, Hwaseong-si (KR)

(72) Inventors: Seok Min Kim, Suwon-si (KR); Kwan Ho Kim, Suwon-si (KR); Seong Woon Kim, Suwon-si (KR); Tae Sun Kim, Seongnam-si (KR); Kyoung Mook Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 149 days.

(21) Appl. No.: 14/138,982

(22) Filed: Dec. 23, 2013

(65) Prior Publication Data

US 2014/0195742 A1    Jul. 10, 2014

(30) Foreign Application Priority Data

Jan. 7, 2013   (KR) .................. 10-2013-0001758

(51) Int. Cl.
   *G06F 12/10*   (2006.01)
   *G06F 12/02*   (2006.01)
   *G06F 12/08*   (2006.01)

(52) U.S. Cl.
   CPC .......... *G06F 12/1027* (2013.01); *G06F 12/023* (2013.01); *G06F 12/0813* (2013.01); *G06F 12/1072* (2013.01); *G06F 2212/306* (2013.01)

(58) Field of Classification Search
   None
   See application file for complete search history.

(56) References Cited

U.S. PATENT DOCUMENTS

| 6,292,874 | B1 | 9/2001 | Barnett |
| 7,509,391 | B1 | 3/2009 | Chauvel et al. |
| 8,214,618 | B2 | 7/2012 | Jeong |
| 2003/0072316 | A1* | 4/2003 | Niu et al. ................. 370/412 |
| 2008/0109592 | A1* | 5/2008 | Karamcheti et al. ......... 711/103 |
| 2008/0189506 | A1 | 8/2008 | Kopec et al. |
| 2008/0263256 | A1* | 10/2008 | Gudeth et al. .............. 711/2 |
| 2010/0185831 | A1 | 7/2010 | Iguchi |
| 2012/0038952 | A1* | 2/2012 | Cho ....................... 358/1.16 |

FOREIGN PATENT DOCUMENTS

| JP | 2004-355187 A | 12/2004 |
| JP | 2010-026969 A | 2/2010 |
| JP | 2012-068840 A | 4/2012 |
| KR | 10-0705171 B1 | 4/2007 |
| KR | 2008-0097573 A | 11/2008 |
| KR | 2012-0037975 A | 4/2012 |

* cited by examiner

*Primary Examiner* — Jared Rutz
*Assistant Examiner* — Christopher Do
(74) *Attorney, Agent, or Firm* — Harness, Dickey & Pierce, P.L.C.

(57) ABSTRACT

A system on chip (SoC) including a memory management unit (MMU) and a memory address translation method thereof are provided. The SoC includes a master intellectual property (IP) configured to output a request corresponding to each of a plurality of working sets; an MMU module comprising a plurality of MMUs, each of which is allocated for one of the working sets and translates virtual addresses corresponding to the request into physical addresses; a first bus interconnect configured to connect the MMU module with a memory device and to transmit the request, on which address translation has been performed in at least one of the MMUs, to the memory device; and a second bus interconnect configured to connect the master IP with the MMU module and to allocate one of the MMUs for each of the working sets.

28 Claims, 12 Drawing Sheets

SYSTEM ON CHIP INCLUDING MEMORY MANAGEMENT UNIT AND MEMORY ADDRESS TRANSLATION METHOD THEREOF

CROSS-REFERENCE TO RELATED APPLICATIONS

This application claims priority under 35 U.S.C. §119(a) from Korean Patent Application No. 10-2013-0001758 filed on Jan. 7, 2013, the disclosure of which is hereby incorporated by reference in its entirety.

BACKGROUND

Example embodiments of the inventive concept relate to a memory management unit, and more particularly, to a memory management unit which is separately used for each of a plurality of working sets when an intellectual property (IP) operates on the working sets, systems including the same, and a method of operating the same.

A memory management unit (MMU) may be a hardware component that processes a memory access request issued by direct memory access units such as a central processing unit (CPU) and a graphics processing unit (GPU). The MMU may be referred to as a paged MMU (PMMU).

An IP using virtual memory may access a memory device using a physical address corresponding to a virtual address. At this time, the MMU may translate the virtual address into the physical address.

A system on chip (SoC) may operate with a translation lookaside buffer (TLB) in limited size according to a predetermined page replacement policy in order to increase the area efficiency of the MMU and to increase address translation speed. However, when the SoC operates on a plurality of working sets, an IP may refer to a different address space for each of the working sets. Therefore, when only one MMU is used, a working set using the IP changes, which may result in the decrease of the hit ratio of the TLB.

SUMMARY

According to some example embodiments of the inventive concepts, there is provided a system on chip (SoC) including a master intellectual property (IP) configured to output a request corresponding to each of a plurality of working sets; a memory management unit (MMU) module including a plurality of MMUs, each of which is allocated for one of the working sets and is configured to translate virtual addresses corresponding to the request into physical addresses; and a first bus interconnect configured to connect the MMU module with a memory device and to transmit the request, on which address translation has been performed in at least one of the MMUs, to the memory device.

The MMUs in the MMU module may operate independently from each other for respective working sets from among the plurality of working sets.

The working sets may include a read working set and a write working set, and the MMU module may include a first MMU configured to access the read working set in the memory device according to a read request of the master IP; and a second MMU configured to access the write working set in the memory device according to a write request of the master IP.

The first MMU may be connected with the master IP through a read channel and the second MMU may be connected with the master IP through a write channel.

The working sets may include a source set and a destination set, and the MMU module may include a first MMU configured to access the source set in the memory device according to a source access request of the master IP; and a second MMU configured to access the destination set in the memory device according to a destination access request of the master IP.

The SoC may further include a second bus interconnect configured to connect the master IP with the MMU module and to dynamically allocate either of the first and second MMUs according to the request of the master IP.

According to other example embodiments of the inventive concepts, there is provided a SoC including a master IP configured to output a request corresponding to each of a plurality of working sets; an MMU module including a plurality of MMUs, each of which is allocated for one of the working sets and is configured to translate virtual addresses corresponding to the request into physical addresses; a first bus interconnect configured to connect the MMU module with a memory device and to transmit the request, on which address translation has been performed in at least one of the MMUs, to the memory device; and a second bus interconnect configured to connect the master IP with the MMU module and to allocate one of the MMUs for each of the working sets.

According to further example embodiments of the inventive concepts, there is provided a memory address translation method including outputting a request for each of a plurality of working sets, which are processed by a master IP, using the master IP; storing MMU allocation information corresponding to each of the working sets; comparing the virtual addresses corresponding to the request with the MMU allocation information in response to the request of the master IP; outputting an identification (ID) of the MMU corresponding to the request based on the MMU allocation information as a result of the comparison; translating virtual addresses corresponding to the request into physical addresses using the MMU corresponding to the ID; and transmitting the address-translated request to the physical addresses of a memory device.

According to further example embodiments of the inventive concepts, there is provided an electronic system including a master intellectual property (IP) configured to output a request corresponding to each of a plurality of working sets; a memory management unit (MMU) module comprising a plurality of MMUs, each of which is allocated for one of the working sets and is configured to translate virtual addresses corresponding to the request into physical addresses; a memory device configured to process each request of the master IP and to transmit a response or data corresponding to the request; a first bus interconnect configured to connect the MMU module with the memory device and configured to transmit each request of the MMUs to the memory device, and to transmit the response or the data corresponding to the request processed by the memory device to the MMU module; and a second bus interconnect configured to connect the master IP with the MMU module, allocate one of the MMUs for each of the working sets, transfer each request of the master IP to the allocated MMU, and transmit the response or the data from the allocated MMU to the master IP.

The second bus interconnect may store MMU allocation information corresponding to each of the working sets and connect the MMU corresponding to the request based on the MMU allocation information when receiving the request from the master IP.

According to example embodiments of the inventive concepts, a system on chip (SoC) may include a master intellectual property (IP) configured to output one or more requests corresponding to a first working set of data and a second working set of data; and a memory management unit (MMU) module including, a first MMU configured to perform a first translation operation including translating a virtual address of the first working set of data into a physical address, and a second MMU configured to perform a second translation operation including translating a virtual address of the second working set of data into a physical address, wherein the MMU module is configured such that the first and second MMUs are different units and the first and second translation operations are performed by the first and second MMUs simultaneously.

The first MMU may include a first memory buffer and may be configured to perform the first translation operation by using the first memory buffer, and the second MMU may include a second memory buffer and may be configured to perform the second translation operation by using the second memory buffer.

The first and second memory buffers may be translation lookaside buffers (TLBs).

The SoC may further include a first bus interconnect configured to connect the MMU module with a memory device and to transmit the request to the memory device, the first and second working sets of data being stored in the memory device.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE EMBODIMENTS

Figure 1:
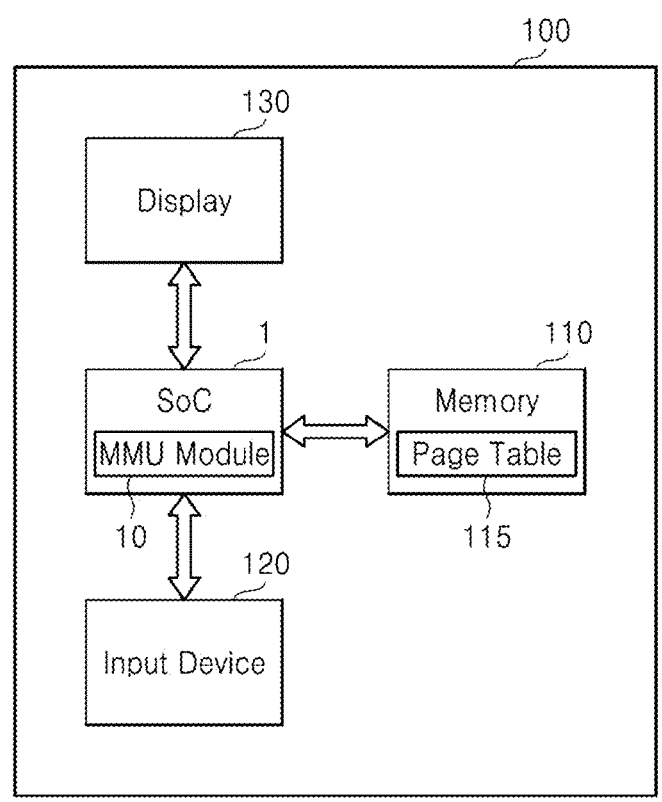
FIG. 1 is a block diagram of an electronic system including a memory management unit (MMU) according to some example embodiments of the inventive concepts.

Example embodiments of the inventive concepts now will be described more fully hereinafter with reference to the accompanying drawings, in which example embodiments of the inventive concepts are shown. Example embodiments of the inventive concepts may, however, be embodied in many different forms and should not be construed as limited to the embodiments set forth herein. Rather, these embodiments are provided so that this disclosure will be thorough and complete, and will fully convey the scope of example embodiments of the inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a block diagram of an electronic system 100 including a memory management unit (MMU) according to some example embodiments of the inventive concepts. The electronic system 100 may be implemented as a data processing device including, for example, a personal computer (PC), a tablet PC, a net-book, an e-reader, a personal digital assistant (PDA), a portable multimedia player (PMP), an MP3 player, or an MP4 player. The electronic system 100 includes a system on chip (SoC) 1 which controls the overall operation of the electronic system 100.

The SoC 1 may be implemented as a processor, which is a unit reading and executing program instructions. The SoC 1 executes program instructions, for example, generated by an input signal input through an input device 120. The SoC 1 may read data from a memory device 110 and display the data through a display 130.

The memory device 110 is a storage device storing data. It may store an operating system (OS), various programs, and various data. The memory device 110 may process data according to a request received from the SoC 1. The memory device 110 may be a non-volatile memory device such as a flash memory, a phase-change random access memory (PRAM), a magnetic RAM (MRAM), a resistive RAM (ReRAM), or a ferroelectric RAM (FeRAM) or a volatile memory device such as a dynamic RAM (DRAM) or a static RAM (SRAM). In other embodiments, the memory device 110 may be an embedded memory provided within the SoC 1. The memory device 110 may include a page table 115 used to translate a virtual address into a physical address. The input device 120 may be implemented by a keypad, a keyboard, or a pointing device such as a touch pad or a computer mouse.

Figure 2:
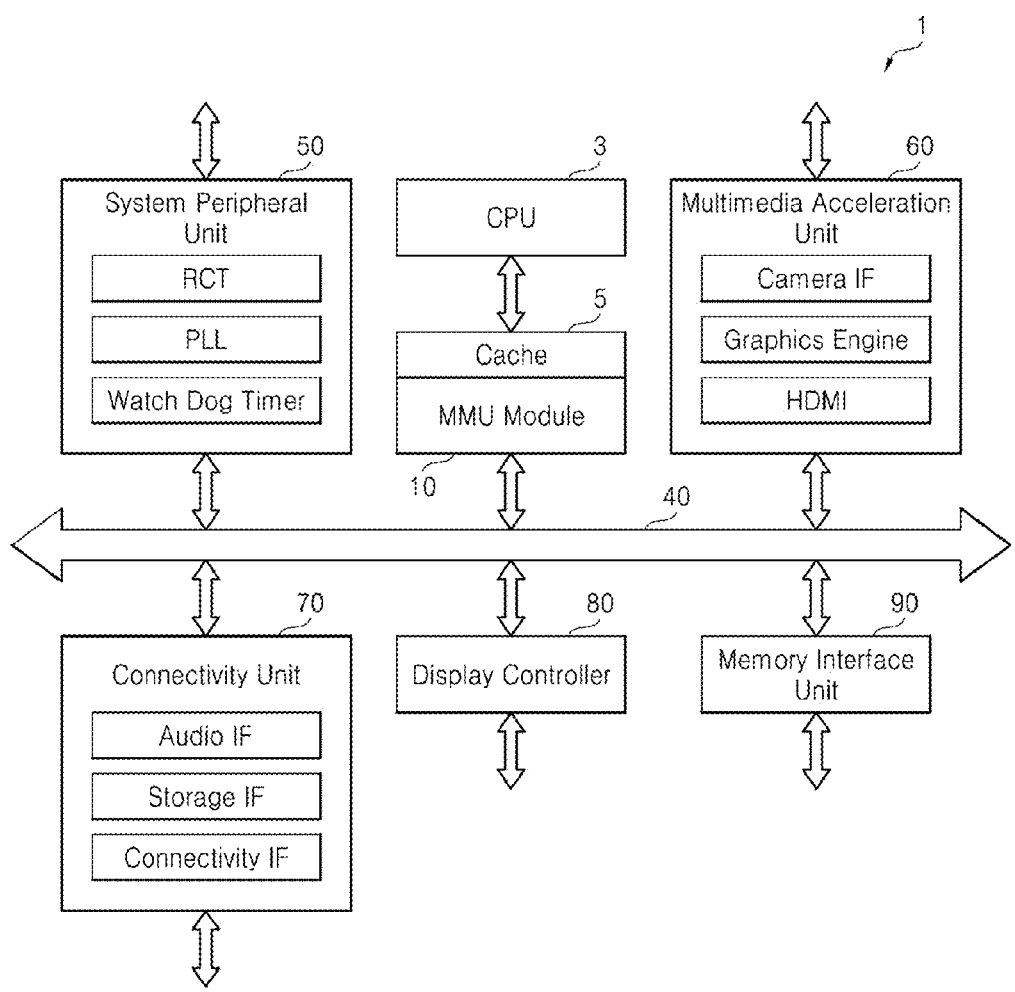
FIG. 2 is a block diagram of a system on chip (SoC) illustrated in FIG. 1.

FIG. 2 is a block diagram of the SoC 1 illustrated in FIG. 1. In the examples illustrated in FIGS. 1 and 2, the SoC 1 includes a central processing unit (CPU) 3, a cache 5, and an MMU module 10.

The CPU 3 may be a part of the processor 1 that reads and executes program instructions. The cache 5 is a component which may store data so that the data is quickly read from and/or written to the memory device 110. The CPU 3 may read (or perform page-in of) the content of a page from the memory device 110 and store it in the cache 5. The CPU 3 may write (or perform page-out of) the content of the page that has been stored in the cache 5 to the memory device 110.

The MMU module 10 may be a hardware component which processes an access to the memory device 110 at the request of the CPU 3. The functions of the MMU module 10 may include translating a virtual address corresponding to a request from the CPU 3, a graphics processing unit (GPU), a display controller 80, or a graphics engine included in a multimedia acceleration unit 60, into a physical address, memory protection, controlling the cache 5, bus arbitration, and/or bank switching.

The SoC 1 may also include a system peripheral unit 50, the multimedia acceleration unit 60, a connectivity unit 70, a display controller 80, and a memory interface unit 90. The system peripheral unit 50, the multimedia acceleration unit 60, the connectivity unit 70, the display controller 80, and the memory interface unit 90 may transmit and receive data and/or instructions through a system bus 40. The system bus 40 may include a plurality of channels. The channels may include a read data channel (R), a read address channel (AR), a write address channel (WR), a write response channel (B), and a write data channel (W) according to an advanced extensible interface (AXI) protocol.

The system peripheral unit 50 may include a real-time clock (RTC), a phase-locked loop (PLL), and a watch dog timer. The multimedia acceleration unit 60 includes the graphics engine. The multimedia acceleration unit 60 may include a camera interface, the graphics engine integrated with a frame buffer or another video display circuitry for graphics computation, and a high-definition multimedia interface (HDMI) which is an audio/video interface for transmission of uncompressed digital data. The MMU module 10 may be used to translate a virtual address output from the graphics engine into a physical address. The multimedia acceleration unit 60 may include an analog television encoding system, i.e., a national television system committee (NTSC)/phase alternate line (PAL) system instead of the HDMI.

The connectivity unit 70 may include an audio interface (IF), a storage IF like an advanced technology attachment (ATA) IF, and a connectivity IF. The connectivity unit 70 may communicate with the input device 120.

The display controller 80 may control data to be displayed on the display 130. The MMU module 10 may be used to translate a virtual address output from the display controller 80 into a physical address.

The memory interface unit 90 may enable the memory device 110 to be accessed according to the type of memory (e.g., a flash memory or DRAM).

For the sake of convenience, in the description, it is assumed that processors such as the CPU 3, the graphic engine, and the display controller 80 that process data in each working set each are referred to as a master intellectual property (IP). The master IP may operate for each working set and may process a plurality of working sets at a time. A working set is a data set stored in the memory device 110. The working set indicates a set of pages referred to frequently, for example above a reference number of times in a reference period of time, in the memory device 110 by the master IP or the amount of pages that can be loaded from the master IP to the memory device 110. At this time, in the master IP each working set is managed independently from other working sets.

Figure 3:
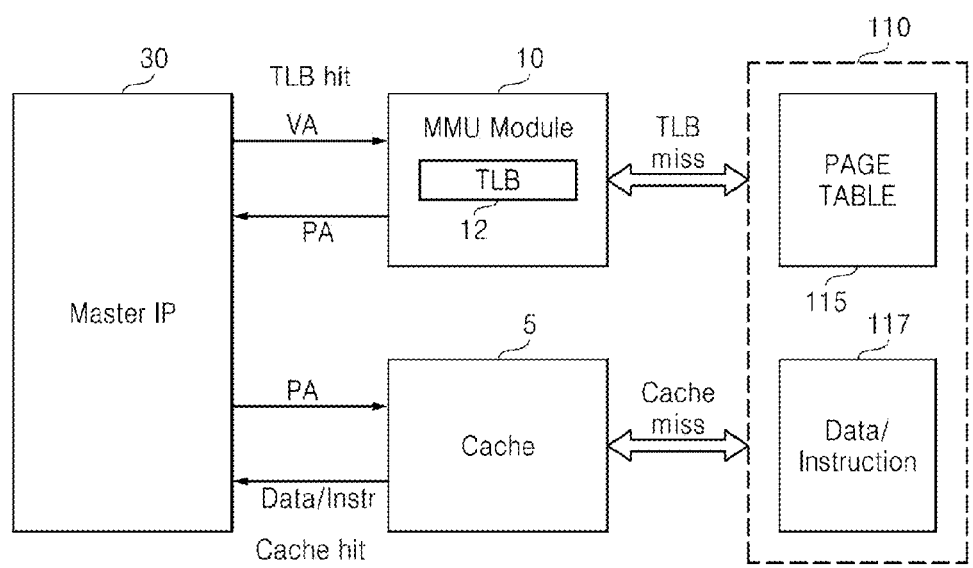
FIG. 3 is a conceptual diagram for explaining the operation of an MMU module illustrated in FIG. 2.

FIG. 3 is a conceptual diagram for explaining the operation of the MMU module 10 illustrated in FIG. 2. Referring to FIGS. 1 through 3, the MMU module 10 may include a translation lookaside table (TLB) 12 and is connected with the master IP 30 and the memory device 110 through a plurality of channels (i.e., R, AR, AW, B, and W).

The master IP 30 may process a plurality of working sets. In order to operate for the working sets, the master IP 30 may output a request corresponding to each of the working sets to the MMU module 10 or the cache 5. At this time, the request output by the master IP 30 includes a virtual address VA for a working set in the memory device 110.

The MMU module 10 may compute and output a page physical address PA using the virtual address VA at the request of the master IP 30. The page physical address PA may be, for example, a combination of a page number of the virtual address VA and an offset (e.g., a page table pointer) of the virtual address VA. The page physical address PA is an address used as an index to access a page table 115.

The TLB 12 is a memory management hardware which may be used to increase a virtual address translation speed. A page number and a frame number are mapped in the TLB 12. In other words, the TLB 12 stores mapping between the virtual address VA and the physical address PA for pages referred to by the master IP 30. When translating the virtual address VA into the physical address PA, the MMU module 10 first checks the TLB 12. When there is mapping information regarding the virtual address VA corresponding to a request of the master IP 30 in the TLB 12, the MMU module 10 may directly processes the translation without accessing the memory device 110 (which is referred to as "TLB hit").

However, when there is no mapping information regarding the virtual address VA corresponding to the request of the master IP 30 in the TLB 12 (which is referred to as "TLB miss"), a page table walk (PTW) may be performed. The PTW is a process of finding out whether a page number and a frame number of the virtual address VA exist in the page table 110 of the memory device 110 when they are not matched in the TLB 12, that is, when there is no information of the physical address PA mapped to the virtual address VA in the TLB 12. The page table 115 stores information about mapping between the virtual address VA and the physical address PA for data in the memory device 110.

When the master IP 30 attempts to read an instruction or data using the physical address PA and the instruction or the data corresponding to the physical address PA is in the cache 5, the cache 5 may output the instruction or the data to the master IP 30 directly, without accessing the memory device 110 (which is referred to as "cache hit"). However, when the instruction or the data does not exist in the cache 5, the cache 5 may access a data/instruction storage block 117 to read the instruction or the data (which is referred to as "cache miss"). The data/instruction storage block 117 stores information about each of the data/instructions in the memory device 110.

Figure 4:
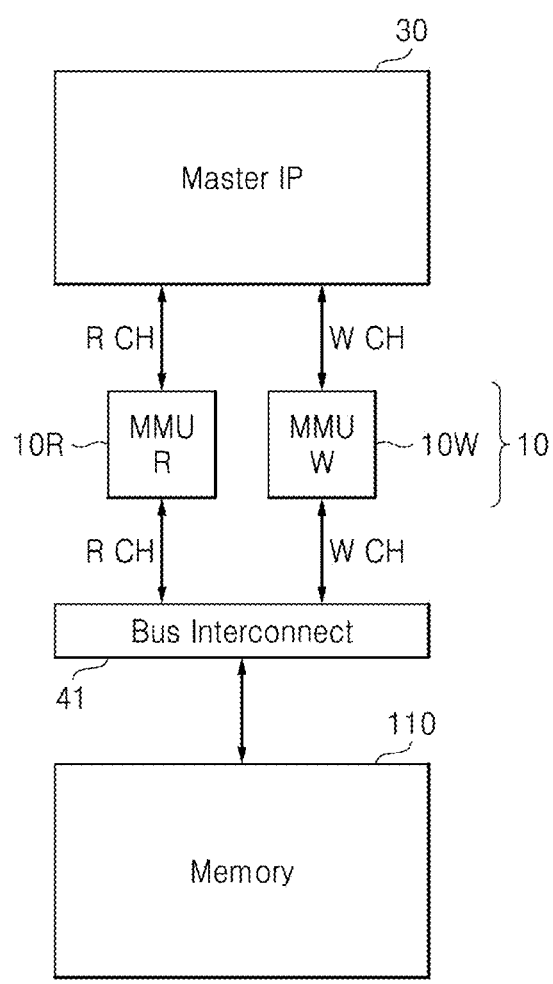
FIG. 4 is a conceptual diagram for explaining a structure including the MMU module according to some example embodiments of the inventive concepts.

FIG. 4 is a conceptual diagram for explaining a structure including the MMU module 10 according to some example embodiments of the inventive concepts. For the sake of convenience, in the description, only the master IP 30, the MMU module 10, a bus interconnect 41, and the memory device 110 are illustrated.

The master IP 30 may operate, for example, in units of working sets. The master IP 30 may perform operations with respect to a plurality of working sets. According to example embodiments of the inventive concepts, the working sets in the memory device 110 may be independent from each other and the master IP 30 manages each working set independently.

When processing a working set, the master IP 30 may output a request and virtual addresses VA of the data of the working set to the MMU module 10. Cases where the master IP 30 performs a read operation and a write operation on the memory device 110 will be described with reference to FIG. 4.

The plurality of working sets may include a read working set and a write working set. In other words, the working sets may be divided into a read working set for reading data from the memory device 110 at the read request of the master IP 30 and a write working set for writing data to the memory device 110 at the write request of the master IP 30.

In the example illustrated in FIG. 4, the MMU module 10 includes a plurality of MMUs 10R and 10W. The MMUs 10R and 10W are allocated for the working sets, respectively, and independently operate from each other for a different working set.

The first MMU 10R is allocated to access the read working set in the memory device 110 at the read request of the master IP 30. The first MMU 10R is connected to a read channel RCH. The read channel RCH transmits the read request from the master IP 30, a response from the memory device 110, and data read from the memory device 110 at the read request to the master IP 30. The read channel RCH connects the master IP 30 with the MMU module 10 and connects the MMU module 10 with the memory device 110. The read channel RCH may include an AR channel and an R channel according to an AXI bus protocol.

The first MMU 10R may translate the virtual address VA corresponding to the read request received from the master IP 30 into the physical address PA, transmit the read request translated into the physical address PA to the memory device 110, and transmit data read from the memory device 110 and a response to the read request to the master IP 30.

The second MMU 10W is allocated to access the write working set in the memory device 110 at the write request of the master IP 30. The second MMU 10W is connected to a write channel WCH. The write channel WCH transmits the write request from the master IP 30, a response from the memory device 110, and data to be written to the memory device 110 at the write request to the memory device 110. The write channel WCH connects the master IP 30 with the MMU module 10 and connects the MMU module 10 with the memory device 110. The write channel WCH may include an AW channel, a W channel, and a B channel according to the AXI bus protocol.

The second MMU 10W may translate the virtual address VA of an area, to which the data will be written at the write request received from the master IP 30, into the physical address PA and translate the physical address PA of the data written to the memory device 110 into the virtual address VA.

The read channel RCH between the master IP 30 and the first MMU 10R and the write channel WCH between the master IP 30 and the second MMU 10W may be connected with each other in hardware.

The bus interconnect 41 may be included in the read channel RCH or the write channel WCH between the memory device 110 and the MMU module 10. The bus interconnect 41 connects the memory device 110 and the MMU module 10 and enables a memory access area in the memory device 110 to be different for an access of each of the MMUs 10R and 10W.

The read working set and the write working set may be located independently from each other in the memory device 110. When the first MMU 10R accesses, the bus interconnect 41 connects the first MMU 10R to the read working set in the memory device 110. When the second MMU 10W accesses, the bus interconnect 41 may connect the second MMU 10W to the write working set in the memory device 110. Alternatively, the bus interconnect 41 may change a memory access timing for the access of each of the MMUs 10R and 10W. At this time, the read working set and the write working set in the memory device 110 may be accessed temporally independently from each other.

Figure 5:
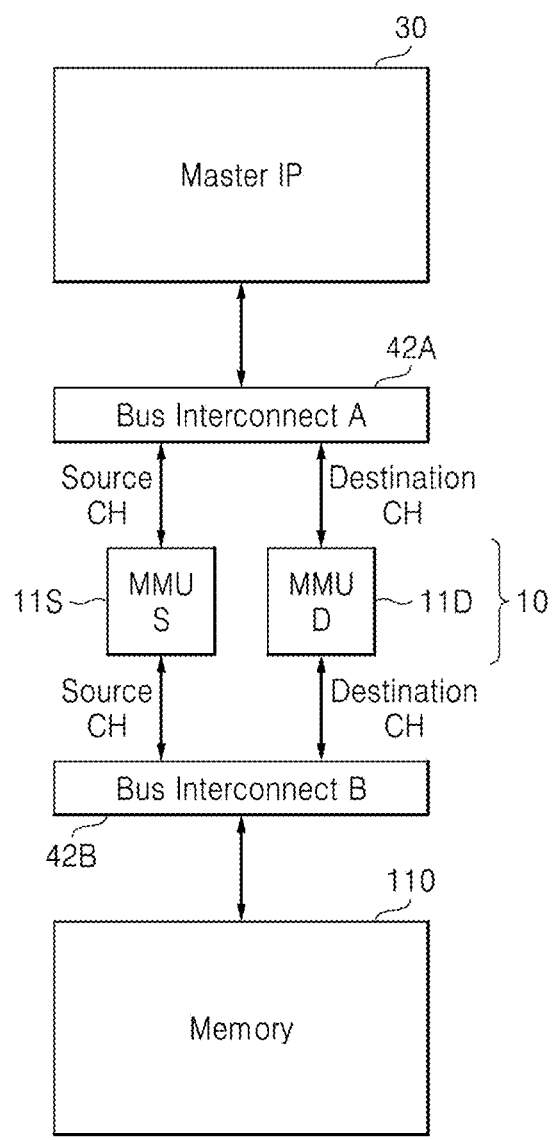
FIG. 5 is a conceptual diagram for explaining a structure including the MMU module according to other example embodiments of the inventive concepts.

FIG. 5 is a conceptual diagram for explaining a structure including the MMU module 10 according to other example embodiments of the inventive concepts. For the sake of convenience, in the description, only the master IP 30, the MMU module 10, bus interconnects 42A and 42B, and the memory device 110 are illustrated.

The master IP 30 may operate, for example, in units of working sets. The master IP 30 may perform operations with respect to a plurality of working sets. According to example embodiments of the inventive concepts, the working sets in the memory device 110 are independent from each other and the master IP 30 manages each working set independently. When processing a working set, the master IP 30 outputs a request and virtual addresses VA of the data of the working set to the MMU module 10.

Cases where the master IP 30 performs a read operation and a write operation on the memory device 110 will be described with reference to FIG. 5. Here, the master IP 30 may be an image scaler IP. Unlike the embodiments illustrated in FIG. 4 in which the working sets are divided into the read working set and the write working set according to an operation, the working sets are divided into a source set and a destination set according to the memory access area of data to be processed by the master IP 30 in the current embodiments illustrated in FIG. 5.

In detail, when the master IP 30 performs an operation of outputting destination data by combining source data with destination data like a data scaler IP or a data dithering IP, a working set in a memory area in which source data for the read operation is concentrated is defined as the source set and a working set in a memory area in which destination data for the read and write operations is concentrated is defined as the destination set.

In the example illustrated in FIG. 5, the MMU module 10 includes a plurality of MMUs 11S and 11D. The MMUs 11S and 11D are allocated for the working sets, respectively, and independently operate from each other for a different working set.

The first MMU 11S is allocated to access the source set in the memory device 110 at the source access request of the master IP 30. The first MMU 11S is connected to a source channel Source CH that transmits the source access request and source data read from the memory device 110. The source channel Source CH connects the master IP 30 with the MMU module 10 and connects the MMU module 10 with the memory device 110. The first MMU 11S may translate the virtual address VA corresponding to the source data into the physical address PA.

The second MMU 11D is allocated to access the destination set in the memory device 110 at the destination access request of the master IP 30. The second MMU 11D is connected to a destination channel Destination CH that transmits the destination access request and destination data that is read from the memory device 110 and written to the memory device 110. The destination channel Destination CH connects the master IP 30 with the MMU module 10 and connects the MMU module 10 with the memory device 110.

The second MMU 11D may translate the virtual address VA of the destination data read from the memory device 110 into the physical address PA and translate the physical address PA, to which the destination set is written after the operation of the master IP 30, into the virtual address VA.

The first bus interconnect 42B may be included in the source channel Source CH or the destination channel Destination CH between the memory device 110 and the MMU module 10. A second bus interconnect 42A may be included in the source channel Source CH or the destination channel Destination CH between the master IP 30 and the MMU module 10.

The first and second bus interconnects 42B and 42A may be dynamically allocated for the first MMU 11S or the second MMU 11D according to a working set. For instance, the first and second bus interconnects 42B and 42A check to find out whether the virtual address VA of a working set processed by the master IP 30 or the memory device 110 is for the source set or the destination set and transmits a request and data corresponding to the request to the MMU 11S or 11D allocated for the working set.

The first and second bus interconnects 42B and 42A may change a memory access area in the memory device 110 according to a working set to be processed. In this case, the source set and the destination set may be independent memory areas in the memory device 110.

The second bus interconnect 42A connects to the first MMU 11S when the working set to be processed by the master IP 30 is the source set. However, when the working set to be processed by the master IP 30 is the destination set, the second bus interconnect 42A connects to the second MMU 11D. The first bus interconnect 42B also connects to the first MMU 11S when the working set is the source set and connects to the second MMU 11D when the working set is the destination set.

Alternatively, the first bus interconnect 42B may change a memory access timing to the memory device 110 for each of the MMUs 11S and 11D. In this case, the source set and the destination set in the memory device 110 may be temporally independently accessed. As a result, during data blending, the hit ratio of the MMU module 10 is increased and the processing speed of the SoC1 is also increased. In addition, since the MMU module 10 is used for each working set, an MMU is flexibly operated.

Figure 6:
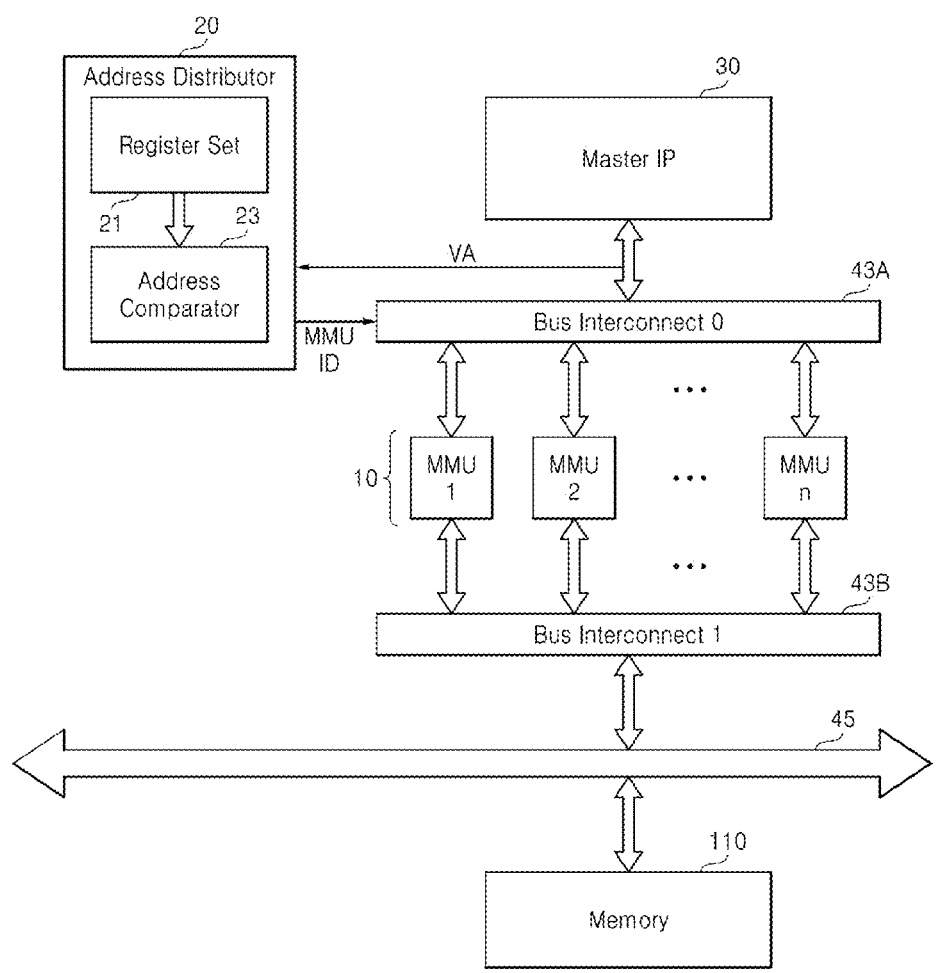
FIG. 6 is a conceptual diagram for explaining a structure including the MMU module according to further example embodiments of the inventive concepts.
Figure 7:
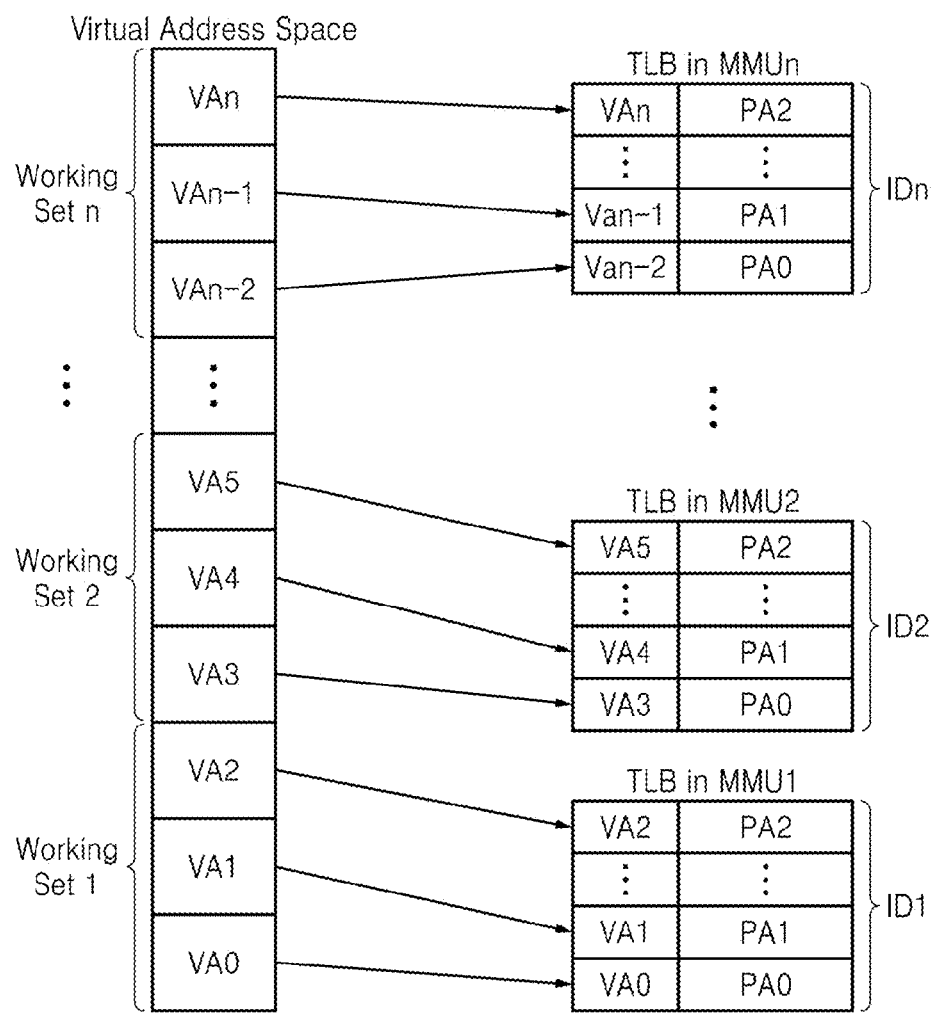
FIG. 7 is a conceptual diagram for explaining the operation of the MMU module illustrated in FIG. 6.

FIG. 6 is a conceptual diagram for explaining a structure including the MMU module 10, which is illustrated as MMUs1-n, according to further example embodiments of the inventive concepts. FIG. 7 is a conceptual diagram for explaining the operation of the MMU module 10 illustrated in FIG. 6. The SoC 1 may include the master IP 30, the MMU module 10 including MMUs1-n, the system bus 45, the memory device 110, and an address distributor 20. For convenience' sake, only some elements of the SoC 1 are illustrated in FIG. 6, but other elements may also be included in the SoC 1 as shown in FIG. 2.

The master IP 30 may be, for example, a processor such as the CPU 3, the graphics engine, or the display controller 80 that processes data in units of working sets. The master IP 30 may operate for each working set and may process a plurality of working sets at a time. A working set is a data set stored in the memory device 110. The working set indicates a set of pages that the master IP 30 accesses frequently, for example above a reference number of times in a reference period of time, or the amount of pages that can be loaded from the master IP 30 to the memory device 110. According to example embodiments of the inventive concepts, in the master IP 30 each working set is managed independently from other working sets. The system bus 45 includes a first bus interconnect 43B, a second bus interconnect 43A, and channels connected to each MMU, the master IP 30, and the memory device 110. The system bus 45 transmits requests and data between the master IP 30 and the memory device 110.

When the master IP 30 performs operations with respect to a plurality of working sets, the address distributor 20 may dynamically allocate an MMU for each of the working sets. The address distributor 20 stores MMU allocation information corresponding to each of the working sets. Upon receiving a request for a working set from the master IP 30, the address distributor 20 may output an identification (ID) of an MMU corresponding to the virtual address VA included in the request to the second bus interconnect 43A based on the MMU allocation information. The second bus interconnect 43A may transmit the request and data to the MMU corresponding to the ID.

The address distributor 20 includes a register set 21 and an address comparator 23. The register set 21 stores the MMU allocation information corresponding to each of the working sets. In other words, the register set 21 stores the MMU allocation information in which virtual addresses VA corresponding to each working set is mapped to an MMU ID. According to example embodiments of the inventive concepts, the MMU allocation information may include indicator information for distinguishing the virtual addresses VA for each working set. The indicator information may be, for example, a starting point and/or an ending point of the consecutive virtual addresses VA of a working set.

The address comparator 23 may compare the virtual addresses VA of the request received from the master IP 30 with the MMU allocation information. The address comparator 23 may output an MMU ID corresponding to the request as a result of the comparison.

In detail, as shown in FIG. 7, first through n-th working sets may include, for example, a plurality of pages referred to frequently, for example above a reference number of times in a reference period of time, in the memory device 110 by the master IP 30, that is, a plurality of adjacent virtual addresses VA. For instance, the first working set includes virtual addresses VA0 through VA2. However, the working sets are managed independently from one another in the operation of the master IP 30. In other words, a single virtual address VA does not belong to two or more working sets. For instance, the virtual addresses VA0 through VAn may be consecutively arranged for the working sets as shown in FIG. 7.

Each MMU translates the virtual address VA of a working set mapped to the MMU into the physical address PA. The address translation may be carried out based on a TLB within the MMU. The physical address PA translated by the MMU may be different from or the same as a physical address translated by another MMU.

When it is assumed that a working set of data to be processed by the master IP 30 is mapped to MMU1, the second bus interconnect 43A receives ID1 of MMU1 from the address distributor 20 and transmits a request of the master IP 30 and data to MMU1. MMU1 translates the virtual address VA for the request into the physical address PA and transmits the request translated into the physical address PA and the data to the memory device 110 through the first bus interconnect 43B. The first bus interconnect 43B accesses the physical address PA in the memory device 110 and performs an operation corresponding to the request on the data. At this time, the request may be a read operation, a write operation, or an erase operation.

When the master IP 30 starts an operation with respect to another working set while performing an operation with respect to a current working set, one of MMUs that have not been allocated for the current working set in the MMU module 10 is allocated for the new working set and operated independently. As a result, TLB miss is reduced as compared to a case where only one MMU is shared for all working sets used by the master IP 30. Accordingly, the hit ratio is increased during the data processing operation of the master IP 30 and the operation speed of the SoC 1 is also increased while mutual influence between working sets is minimized or reduced. In addition, since an MMU is allocated for each working set, the MMU is flexibly operated.

Figure 8:
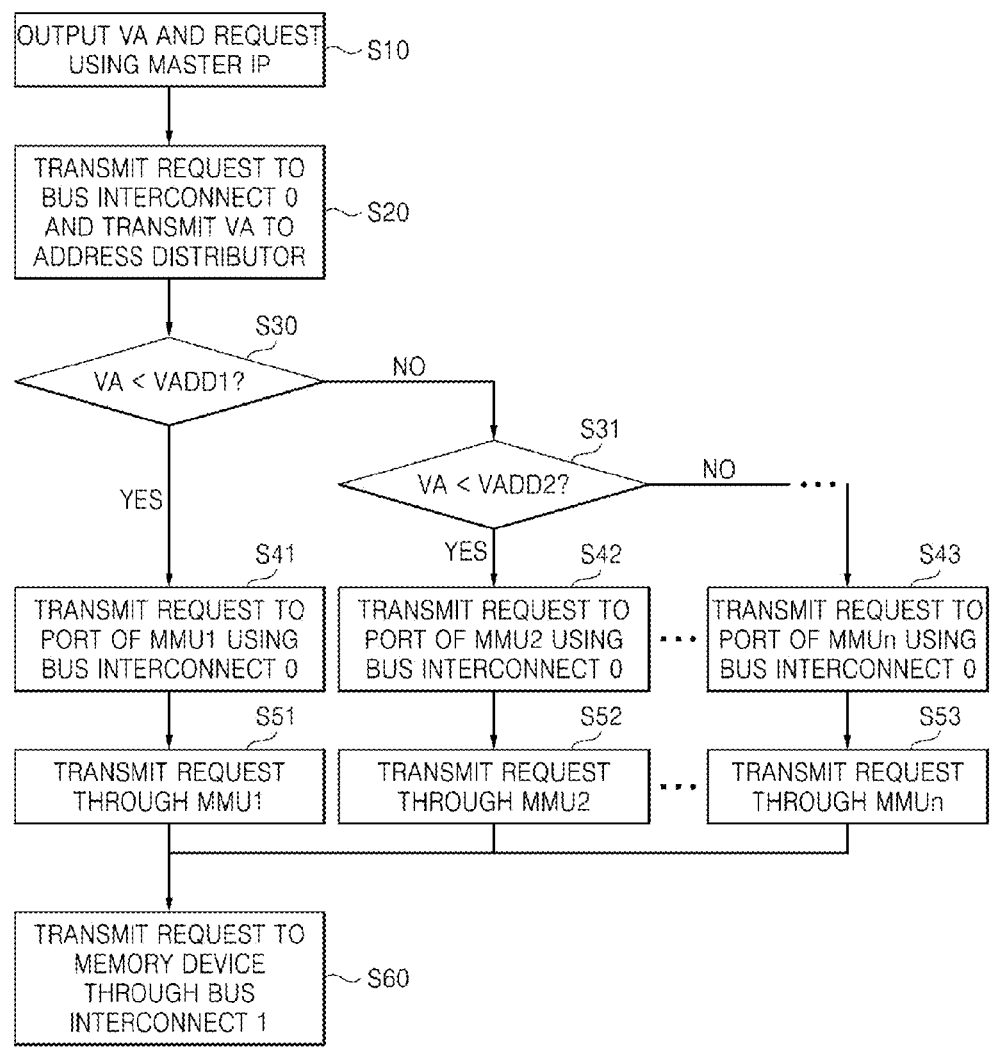
FIGS. 8 and 9 are flowcharts of a memory address translation method performed using the structure illustrated in FIG. 6 according to some example embodiments of the inventive concepts.
Figure 9:
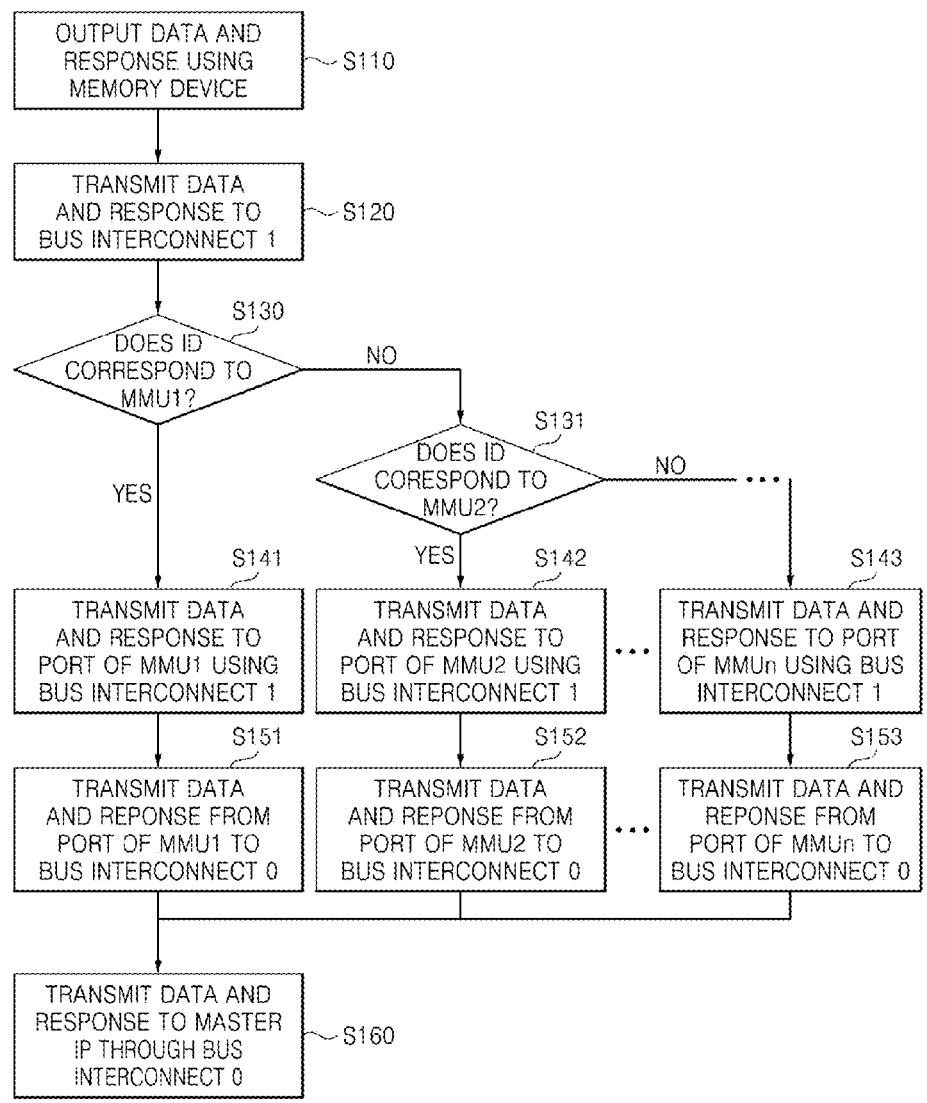

FIGS. 8 and 9 are flowcharts of a memory address translation method performed using the structure illustrated in FIG. 6 according to some example embodiments of the inventive concepts. It is assumed that when the master IP 30 issues a request to the memory device 110, virtual addresses for the request received by an MMU are consecutive. In other words, the MMU1 receives consecutive virtual addresses for a working set, which are located independently from virtual addresses received by MMU2 for a different working set, as shown in FIG. 7.

The master IP 30 outputs a request for an operation on a working set and a virtual address VA for the working set in operation S10. The second bus interconnect 43A (i.e., BUS INTERCONNECT 0) receives the request and the virtual address VA and transmits the virtual address VA to the address distributor 20 in operation S20.

The address distributor 20 compares the virtual address VA with an indicator VADD stored in the register set 21 in operations S30 and S31. The indicator VADD is a virtual address at the border (i.e., the starting point and/or the ending point) among the consecutive virtual addresses allocated to an MMU. For instance, according to one example, it may be assumed that MMUs are allocated for consecutive working sets in such way that the MMU1 is allocated for the first working set ranging from the first virtual address to a virtual address before a first indicator VADD1 among consecutive virtual addresses and the MMU2 is allocated for the second working set ranging from the first indicator VADD1 to a virtual address before a second indicator VADD2 among the consecutive virtual addresses.

The address distributor 20 determines whether the virtual address VA that has been received is for the working set for the MMU1 or for the working set for the MMU2 based on whether the virtual address VA is less than the first indicator VADD1 in operation S30 and S31 and transmits an ID of an MMU corresponding to the virtual address VA to the second bus interconnect 43A. Similarly, an MMU to be allocated among other MMUs is identified based on a result of comparing an indicator VADD with a virtual address VA corresponding to a request.

The second bus interconnect 43A receives the MMU ID corresponding to the request of the master IP 30 from the address distributor 20 and transmits the request and the virtual address VA to an MMU port corresponding to the MMU ID in operations S41 through S43. For instance, when the virtual address VA corresponds to the MMU1, the second bus interconnect 43A transmits the virtual address VA and the request to the port of the MMU1.

The MMU may translate the virtual address VA into a physical address PA using a TLB. The MMU transmits the address-translated request to the first bus interconnect 43B (i.e., BUS INTERCONNECT 1) in operations S51 through S53.

When the first bus interconnect 43B transmits the address-translated request to the memory device 110 in operation S60, the memory device 110 may processes the request at the physical address PA.

Referring to FIG. 9, when the memory device 110 transmits data and a response to the master IP 30 according to a request in operation S110, the memory device 110 outputs the data and the response to the first bus interconnect 43B in operation S120. The first bus interconnect 43B detects an MMU ID to which a physical address of the data is allocated based on the response in operations S130 and S131 and transmits the response and the data to an MMU corresponding to the MMU ID in operations S141 through S143. The response transmitted from the memory device 110 may include information about an MMU that has transmitted the request.

For instance, when a request issued by the master IP 30 is for the first working set and the MMU1 is allocated for the first working set, the first bus interconnect 43B detects the ID of the MMU1 based on the response and transmits the response and the data to the port of the MMU1 in operation S141.

The MMU receives the response and the data and transmits them to the master IP 30 through the second bus interconnect 43A in operations S151 through S153. The master IP 30 processes the response and the data received through the second bus interconnect 43A in operation S160.

Figure 10:
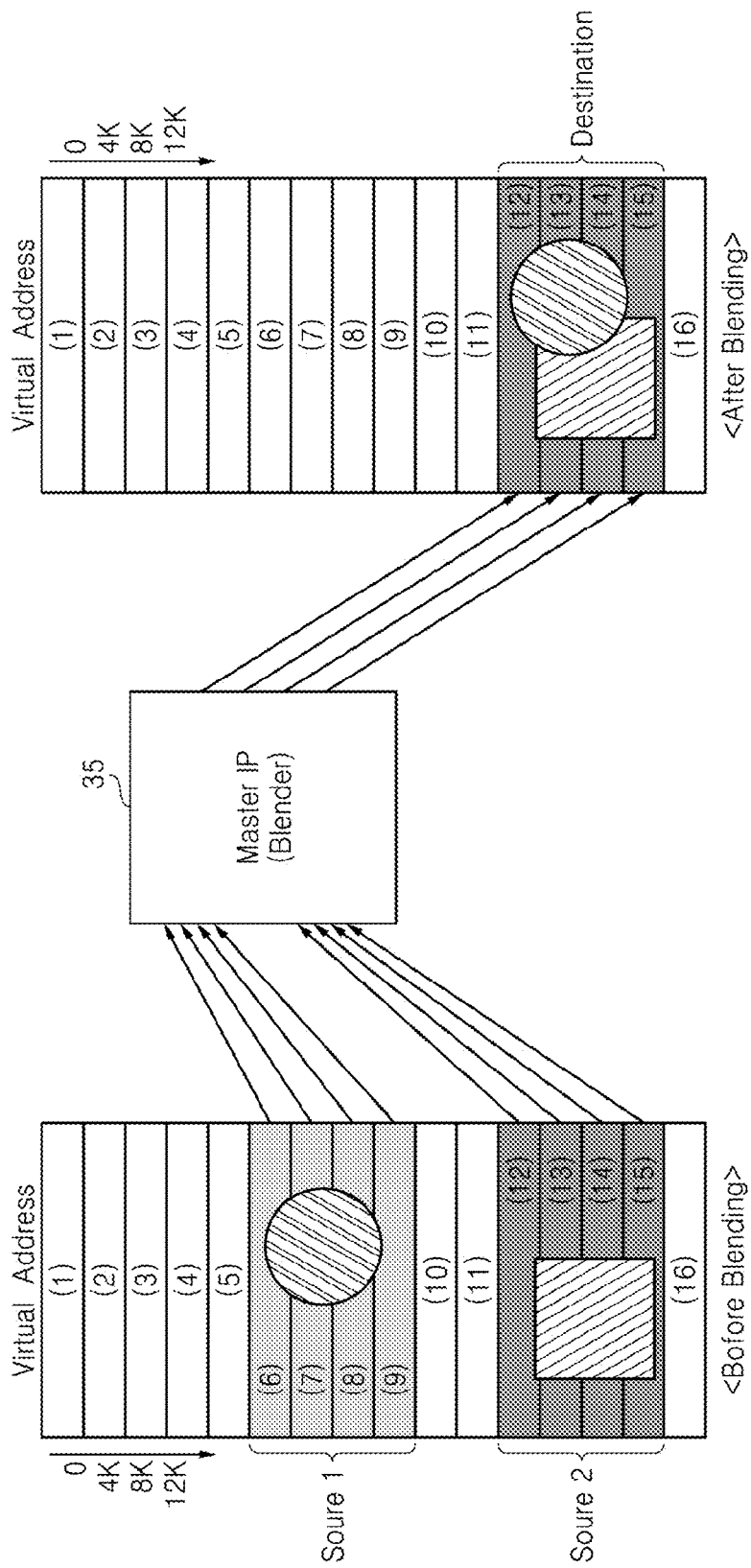
FIG. 10 is a conceptual diagram for explaining an image blending process according to some example embodiments of the inventive concepts.

FIG. 10 is a conceptual diagram for explaining an image blending process according to some example embodiments of the inventive concepts. In the example illustrated in FIG. 10, it is assumed that a master IP 35 blends two images. In detail, when the switch from a first picture to a second picture is made in a mobile device according to a user's setting or certain conditions, an overlaid image displayed to the user in the course of the switch may be an image in which the first picture and the second picture are blended with each other. In this case, the master IP 35 reads two source images, i.e., blending targets from the memory device 110, blends the source images together, and writes a single blended image to the memory device 110. In other words, a plurality of working sets performed by the master IP 35 are composed of two source sets (or two read working sets) and one destination set (or one write working set).

Referring to FIG. 10, a first image, i.e., a circle is stored in a first source set, i.e., Source 1 corresponding to virtual addresses (6) through (9) and a second image, i.e., a square is stored in a second source set, i.e., Source 2 corresponding to virtual addresses (12) through (15). The master IP 35 transmits a first read request and a second read request to the MMU module 10 to perform a read operation on the first source set and a read operation on the second source set. The MMU module 10 checks the virtual addresses (6) through (9) (of the first source set) included in the first read request and the virtual addresses (12) through (16) (of the second source set) included in the second read request and allocates a first MMU for the first source set and a second MMU for the second source set.

The first MMU translates the virtual addresses (6) through (9) of the first source set into physical addresses according to the first read request and accesses the memory device 110. The memory device 110 reads data (i.e., the circle) from the first source set and sends the data to the first MMU together with a response to the first read request. The first MMU transmits the data and the response to the master IP 35.

Similarly, the second MMU translates the virtual addresses (12) through (15) of the second source set into physical addresses according to the second read request and accesses the memory device 110. The memory device 110 reads data (i.e., the square) from the second source set and sends the data to the second MMU together with a response to the second read request. The second MMU transmits the data and the response to the master IP 35.

The first MMU and the second MMU are operated independently from each other with respect to the first source set and the second source set, respectively. Since a process for the first read request and a process for the second read request are respectively allocated to different MMUs, the two processes may be performed at the same time or with a time difference.

The master IP 35 blends the first image (i.e., the circle) corresponding to the first source set with the second image (i.e., the square) corresponding to the second source set. To write a blended image (i.e., the combination of the circle and the square) to the memory device 110, the master IP 35 transmits a write request to the MMU module 10. The blended image is written to a destination set. Here, it is assumed that the virtual address space of the second source set is the same as that of the destination set.

The MMU module 10 checks virtual addresses (of the destination set) included in the write request and allocates an MMU for the destination set. At this time, the MMU allocated for the destination set may be a third MMU or either of the first and second MMUs that is not operating at present. For the sake of convenience, in the description, it is assumed that the third MMU is allocated for the destination set. The third MMU translates the virtual addresses of the destination set into physical addresses according to the write request and accesses the memory device 110 with the write request and the blended image. The memory device 110 writes the blended image to a memory area corresponding to the destination set. The memory device 110 sends a response to the write request to the third MMU. The third MMU transmits the response to the master IP 35.

The read operation of the first or second source set is a prerequisite for the write operation of the destination set, and therefore, the write operation may be independently performed with a time difference from the read operation.

As a result, during the data processing operation of the master IP 35, the hit ratio is increased. In addition, since an MMU is dynamically allocated and independently operated for each working set, the MMU is flexibly operated and the operation speed of the SoC 1 is increased while mutual influence between working sets is minimized or reduced.

Figure 11:
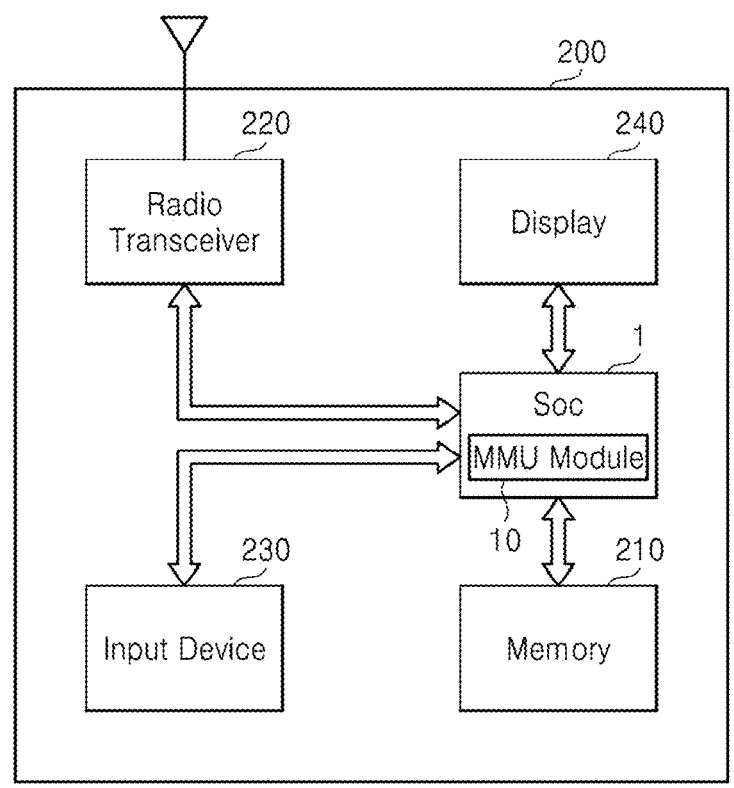
FIG. 11 is a block diagram of an electronic system including the SoC illustrated in FIG. 2 according to some example embodiments of the inventive concepts.

FIG. 11 is a block diagram of an electronic system 200 including the SoC 1 illustrated in FIG. 2 according to some example embodiments of the inventive concepts. Referring to FIG. 11, the electronic system 200 may be implemented as a cellular phone, a smart phone, a tablet PC, a PDA, a PMP, or a radio communication system.

The electronic system 200 includes a memory device 210 storing data. The memory device 210 may include a non-volatile memory and a memory controller. The memory controller may control the data access operation, e.g., the program operation, the erase operation, or the read operation, of the non-volatile memory according to the control of the SoC 1.

A radio transceiver 220 transmits or receives radio signals through an antenna ANT. For instance, the radio transceiver 220 may convert radio signals received through the antenna ANT into signals that can be processed by the SoC 1. Accordingly, the SoC 1 may process the signals output from the radio transceiver 220 and transmit the processed signals to the memory device 210 or a display 240. The memory controller may program or write the signals processed by the SoC 1 to the non-volatile memory. The radio transceiver 220 may also convert signals output from the SoC 1 into radio signals and output the radio signals to an external device through the antenna ANT.

An input device 230 enables control signals for controlling the operation of the SoC 1 or data to be processed by the SoC 1 to be input to the electronic system 200. The input device 230 may be implemented as a keypad, a keyboard, or a pointing device such as a touch pad or a computer mouse.

The SoC 1 may control the operation of the display 240 to display data output from the memory device 210, data output from the radio transceiver 220, or data output from the input device 230.

In other embodiments, the memory controller controlling the operation of the non-volatile memory may be implemented as a part of the SoC 1 or in a chip separated from the SoC 1.

Figure 12:
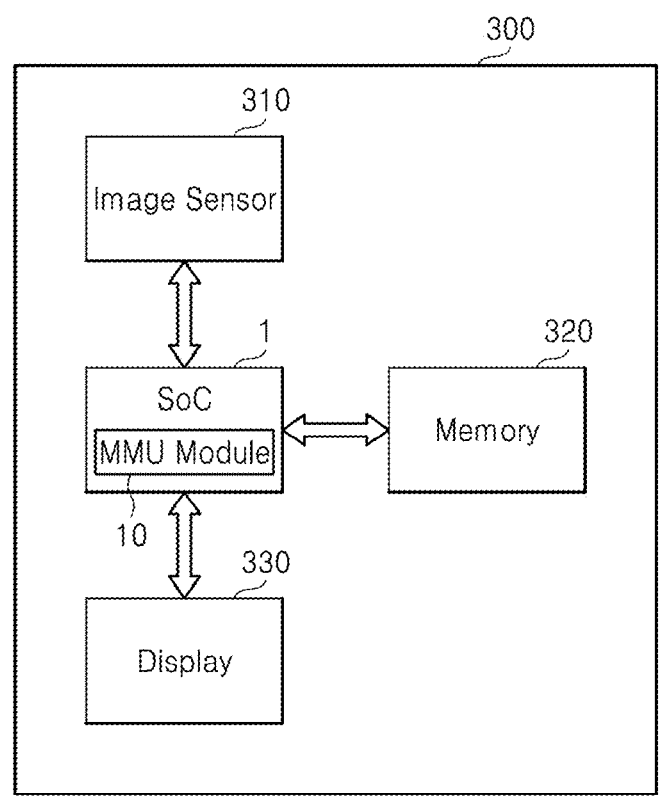
FIG. 12 is a block diagram of an electronic system including the SoC illustrated in FIG. 2 according to other example embodiments of the inventive concepts.

FIG. 12 is a block diagram of an electronic system 300 including the SoC 1 illustrated in FIG. 2 according to other example embodiments of the inventive concepts. Referring to FIG. 12, the electronic system 300 may be implemented as an image processor like a digital camera, a cellular phone equipped with a digital camera, a smart phone equipped with a digital camera, or a tablet PC equipped with a digital camera.

The electronic system 300 includes a memory device 320. The memory device 320 may include a non-volatile memory and a memory controller that controls the data access operation, e.g., the program operation, the erase operation, or the read operation, of the non-volatile memory.

An image sensor 310 included in the electronic system 300 converts optical images into digital image and outputs the digital images to the SoC 1 or the memory device 320. According to the control of the SoC 1, the digital images may be displayed through a display 330 or stored in the memory device 320. Data stored in the memory device 320 may be displayed through the display 330 according to the control of the SoC 1 or the memory controller.

The memory controller controlling the operation of the non-volatile memory may be implemented as a part of the SoC 1 or in a chip separated from the SoC 1.

As described above, according to some example embodiments of the inventive concepts, when a master IP starts an operation with respect to a new working set while performing an operation for a current working set, a SoC allocates an MMU that has not been allocated for the current working set for the new working set in an MMU module and uses the MMUs independently, thereby increasing the hit ratio. In addition, the operation speed of the SoC is increased while mutual influence between working sets is minimized or reduced. Since an MMU is allocated for each of the working sets, the MMU is flexibly operated.

While the Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A system on chip (SoC) comprising:
   one or more processors configured to output requests corresponding to a plurality of working sets, respectively,
   each of the plurality of working sets including virtual addresses from among a plurality of virtual addresses such that no virtual address, from among the plurality of virtual addresses, is included in more than one working set, from among the plurality of working sets;
   a memory management unit (MMU) module including a plurality of MMUs,
   each of the plurality of MMUs being allocated to at least one working set, from among the plurality of working sets, such that there is no working set, from among the plurality of working sets, to which more than one MMU, from among the plurality of MMUs, is allocated,
   each of the plurality of MMUs being configured to translate, into physical addresses, only virtual addresses included in the working sets to which the MMUs are allocated, based on at least one of the requests; and
   a first bus interconnect configured to connect the MMU module with a memory device and to transmit the requests, on which address translation has been performed by one or more MMUs from among the plurality of MMUs, to the memory device.

2. The SoC of claim 1, wherein each of the plurality of working sets is a set of pages frequently referred to in the memory device by the one or more processors, and is managed independently from other working sets in the one or more processors.

3. The SoC of claim 1, wherein the plurality of MMUs in the MMU module are configured to operate independently from each other for respective working sets from among the plurality of working sets.

4. The SoC of claim 1, wherein the plurality of working sets include a read working set and a write working set, and
   the plurality of MMUs includes,
      a first MMU allocated to the read working set in the memory device according to a read request of the one or more processors; and
      a second MMU allocated to the write working set in the memory device according to a write request of the one or more processors.

5. The SoC of claim 4, wherein the first MMU is connected with the one or more processors through a read channel and the second MMU is connected with the one or more processors through a write channel.

6. The SoC of claim 4, wherein the first bus interconnect is configured to connect to the read working set in the memory device when receiving the read request from the first MMU and configured to connect to the write working set in the memory device when receiving the write request from the second MMU.

7. The SoC of claim 1, wherein the plurality of working sets include a source set and a destination set, and
   the plurality of MMUs includes,
      a first MMU allocated to the source set in the memory device according to a source access request of the one or more processors; and
      a second MMU allocated to the destination set in the memory device according to a destination access request of the one or more processors.

8. The SoC of claim 7, further comprising a second bus interconnect configured to connect the one or more processors with the MMU module and to dynamically allocate either of the first and second MMUs according to the request of the one or more processors.

9. The SoC of claim 8, wherein the second bus interconnect is configured to connect to the first MMU when receiving the source access request from the one or more processors and configured to connect to the second MMU when receiving the destination access request from the one or more processors.

10. A system on chip (SoC) comprising:
    one or more processors configured to output requests corresponding to a plurality of working sets, respectively;
    a memory management unit (MMU) module comprising a plurality of MMUs, each of which is allocated for one of the working sets and is configured to translate virtual addresses corresponding to the request into physical addresses;
    a first bus interconnect configured to connect the MMU module with a memory device and to transmit the requests, on which address translation has been performed in at least one of the plurality of MMUs, to the memory device;
    an address comparator configured to
       perform a comparison based on MMU allocation information and virtual addresses corresponding to the requests received from the one or more processors, and
       output, based on the comparison, MMU IDs identifying MMUs, from among the plurality of MMUs, that correspond to the requests; and
    a second bus interconnect configured to connect the master IP with the MMU module and to allocate one of the MMUs for each of the plurality of working sets based on the MMU IDs.

11. The SoC of claim 10, wherein the plurality of working sets are stored in the memory device and each of the plurality of working sets is a set of pages frequently referred to in the memory device by the one or more processors and a data set managed independently from other working sets from among the plurality of working sets.

12. The SoC of claim 10, wherein the plurality of MMUs in the MMU module operate independently from each other for respective working sets from among the plurality of working sets.

13. The SoC of claim 10, further comprising:
    an address distributor configured to store the MMU allocation information corresponding to each of the working sets, wherein the address distributor outputs an identification (ID) of an MMU corresponding to the request based on the MMU allocation information when receiving the request from the one or more processors.

14. The SoC of claim 13, wherein the address distributor comprises:
a register set configured to store the MMU allocation information corresponding to each working set; and
the address comparator.

15. The SoC of claim 14, wherein the register set is configured to map an indicator among consecutive virtual addresses corresponding to each of the working sets to the MMU ID and stores the mapping information as the MMU allocation information.

16. The SoC of claim 15, wherein the address comparator is configured to compare the virtual address corresponding to the request with the indicator and configured to output the MMU ID allocated for the working set.

17. The SoC of claim 10, wherein the first bus interconnect and the second bus interconnect are configured to connect to a port of an MMU dynamically allocated among the plurality of MMUs according to the request of the one or more processors and a response of the memory device.

18. A memory address translation method comprising:
outputting requests for each of a plurality of working sets, respectively, the requests being processed by one or more processors, using the one or more processors;
performing a comparison based on MMU allocation information and virtual addresses corresponding to the requests received from the one or more processors,
determining, based on the comparison, MMU IDs identifying memory management units (MMUs), from among the plurality of MMUs, that correspond to the requests;
allocating one of the plurality of MMUs for each working set based on the determined MMU IDs;
translating virtual addresses corresponding to the requests into physical addresses such that each virtual address is translated using the MMU allocated for working set to which the virtual address belongs; and
transmitting the address-translated requests to the physical addresses of a memory device.

19. The memory address translation method of claim 18, wherein the plurality of working sets are stored in the memory device and each of the plurality of working sets is a set of pages frequently referred to in the memory device by the one or more processors and a data set managed independently from other working sets.

20. The memory address translation method of claim 18, wherein the plurality of MMUs operate independently from each other for the respective working sets.

21. The memory address translation method of claim 18, further comprising:
storing the MMU allocation information, the MMU allocation information corresponding to each of the plurality of working sets.

22. The memory address translation method of claim 18, further comprising:
for each of the plurality of working sets,
processing the working set at the physical addresses according to the request and outputting a response or data corresponding to a processing result using the memory device;
transmitting the response or the data to the MMU allocated for the working set among the plurality of MMUs; and
transmitting the response or the data to the one or more processors.

23. The memory address translation method of claim 22, wherein the response includes the ID of the MMU allocated for the processed working set.

24. An electronic system comprising:
one or more processors configured to output a request corresponding to each of a plurality of working sets;
a memory management unit (MMU) module including a plurality of MMUs, each of which is allocated for one of the plurality of working sets and is configured to translate virtual addresses corresponding to the request into physical addresses;
a memory device configured to process each request of the one or more processors and to transmit a response or data corresponding to the request;
a first bus interconnect configured to connect the MMU module with the memory device, configured to transmit each request of the plurality of MMUs to the memory device, and configured to transmit the response or the data corresponding to the request processed by the memory device to the MMU module; and
a second bus interconnect configured to,
connect the one or more processors with the MMU module,
allocate one of the plurality of MMUs for each of the working sets,
transfer each request of the one or more processors to the allocated MMU, and
transmit the response or the data from the allocated MMU to the one or more processors,
wherein the second bus interconnect stores MMU allocation information corresponding to each of the plurality of working sets and is configured to connect the MMU corresponding to the request based on the MMU allocation information when receiving the request from the one or more processors.

25. A system on chip (SoC) comprising:
one or more processors configured to output a first request corresponding to a first virtual address included in a first working set of data and a second request corresponding to a second virtual address included in a second working set of data;
an address comparator configured to,
perform a comparison operation based on MMU allocation information and the first and second virtual addresses, and
determine a first MMU ID corresponding to the first request and a second MMU ID corresponding to the second request, based on the comparison operation;
a memory management unit (MMU) module including,
a first MMU configured to perform a first translation operation including translating the first virtual address of the first working set of data into a physical address, the first MMU ID identifying the first MMU, and
a second MMU configured to perform a second translation operation including translating the second virtual address of the second working set of data into a physical address, the second MMU ID identifying the second MMU; and
a first bus interconnect configured to,
transmit, based on the first MMU ID, the first virtual address to the first MMU, and
transmit, based on the second MMU ID, the second virtual address to the second MMU,
wherein,
the MMU module is configured such that the first and second MMUs are different units and the first and second translation operations are performed by the first and second MMUs simultaneously.

26. The system on chip (SoC) of claim 25, wherein,
the first MMU includes a first memory buffer and is configured to perform the first translation operation by using the first memory buffer, and
the second MMU includes a second memory buffer and is configured to perform the second translation operation by using the second memory buffer.

27. The system on chip (SoC) of claim 26, wherein the first and second memory buffers are translation lookaside buffers (TLBs).

28. The system on chip (SoC) of claim 25, further comprising:
a second bus interconnect configured to connect the MMU module with a memory device and to transmit the request to the memory device, the first and second working sets of data being stored in the memory device.

* * * * *